Patented Aug. 11, 1931

1,817,957

UNITED STATES PATENT OFFICE

ARTHUR ZITSCHER, OF OFFENBACH-ON-THE-MAIN, GERMANY, ASSIGNOR TO GENERAL ANILINE WORKS, INC., OF NEW YORK, N. Y., A CORPORATION OF DELAWARE

2.3 HYDROXYNAPHTHYL-ARYLKETONES

No Drawing. Application filed December 16, 1927, Serial No. 240,635, and in Germany January 3, 1927.

The present invention relates to new 2.3 hydroxynaphthyl-arylketones.

I have found that ortho hydroxydiarylketones are obtained by treating ortho hydroxyaryl carboxylic acid halides with aromatic hydrocarbons or substitution products thereof in presence of acid condensing agents, preferably of aluminium chloride. It is a surprising fact that such a condensation takes place without the formation of by products and the homogeneous products are obtained in a good yield. The ortho hydroxydiarylketones thus obtained may be used as intermediates for the production of dyestuffs.

Among the new compounds obtainable according to my process especially ortho hydroxydiarylketones may be named, corresponding probably to the formula

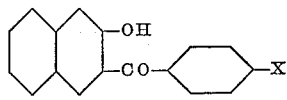

wherein X means an alkyl—or alkyloxy group.

In order to further illustrate my invention the following examples are given, the parts being by weight and all temperatures in Centigrade degrees, but it is understood that my invention is not limited to the particular products or reacting conditions mentioned therein.

Example 1

210 parts of 2.3-hydroxynaphthoyl chloride are dissolved in about 900 parts of benzene (dry and free from thiophene), and then 220 parts of aluminium chloride are introduced while stirring. After heating the mixture at 70–75° for about 2 hours, the reaction product is worked up as usually, dissolved at last in hot dilute caustic soda solution and precipitated from the filtered alkaline solution by introducing carbonic acid. The 2.3-hydroxynaphthophenone corresponding to the formula:

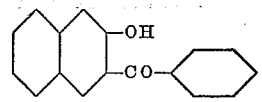

is thus produced in a very good yield and shows, when crystallized from alcohol or ligroine the melting point of 161–162° as described in Berichte der deutschen chemischen Gesellschaft, Vol. 58, page 2122. The condensation may also be carried out in presence of zinc chloride instead of aluminium chloride.

Example 2

105 parts of 2.3-hydroxynaphthoylchloride dissolved in about 500 parts of dry toluene are mixed while stirring with 110 parts of aluminium chloride. The mass is heated at 80–85° for 3 hours. Thus the new 2.3-hydroxynaphthyl-tolyl-ketone corresponding probably to the formula:

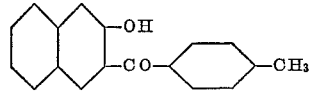

is obtained. It crystallizes from dilute alcohol or ligroine as yellow compact needles melting at 152–153° (uncorrected).

Example 3

105 parts of 2.3-hydroxynaphthoyl chloride, 60 parts anisole in 500 parts of carbon disulfide and 110 parts of aluminium chloride yield, when heated at 45° for about 3 hours, the new 2.3-hydroxynaphthyl-anisyl-ketone probably of the following formula:

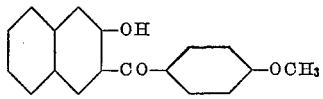

It represents, when crystallized from ligroine, yellow brilliant lamellas melting at 134–134, 5° (uncorrected).

I claim:
1. As new compounds 2.3-hydroxynaphthyl-arylketones of the general formula:

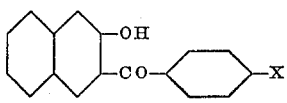

wherein, X means an alkyl or alkyloxy group, which compounds are yellow crystalline substances.

2. As new compounds 2.3-hydroxy-naphthyl-arylketones of the general formula:

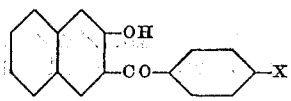

wherein X means a methyl or methoxy group, which compounds are yellow crystalline substances.

In testimony whereof, I affix my signature.

ARTHUR ZITSCHER.